United States Patent [19]
Uchiyama et al.

[11] 4,021,824
[45] May 3, 1977

[54] FLASH LIGHT PHOTOGRAPHIC SYSTEM FOR CAMERA

[75] Inventors: Takashi Uchiyama, Yokohama; Yukio Mashimo, Tokyo; Zenzo Nakamura, Urawa; Yoji Sugiura, Yokohama, all of Japan

[73] Assignee: Canon Kabushiki Kaisha, Tokyo, Japan

[22] Filed: June 4, 1975

[21] Appl. No.: 583,633

[30] Foreign Application Priority Data

June 7, 1974 Japan .............................. 49-64710

[52] U.S. Cl. .................................. 354/33; 354/32; 354/35; 354/60 F; 354/126; 354/139; 354/149
[51] Int. Cl.² .......................................... G03B 7/16
[58] Field of Search .................. 354/27, 32, 33, 34, 354/35, 60 F, 126, 127, 128, 139, 145, 149

[56] References Cited

UNITED STATES PATENTS

| | | | |
|---|---|---|---|
| 3,648,581 | 3/1972 | Umemura | 354/289 |
| 3,675,547 | 7/1972 | Uchiyama et al. | 354/33 |
| 3,688,664 | 9/1972 | Mashimo | 354/33 |
| 3,710,701 | 1/1973 | Takishima et al. | 354/145 |
| 3,714,872 | 2/1973 | Mashimo et al. | 354/33 |
| 3,758,989 | 7/1973 | Ban | 354/60 F |
| 3,886,568 | 5/1975 | Yazaki et al. | 354/27 |

Primary Examiner—Russell E. Adams, Jr.
Attorney, Agent, or Firm—Toren, McGeady and Stanger

[57] ABSTRACT

The present invention relates to the flash photographic system for camera which is characterized in that the system presents a safety device for preventing various misoperations generally apt to take place at the time of taking a photograph by using a flash light device. By means of the operation of this device, the shutter time is set at a certain determined time for taking a photograph under flash light with the shutter time setting means at the camera side whereby the flash light photographic mode setting signal can be obtained only when the light device is set at the state ready for flash lighting in such a manner that the camera is capable of taking a photograph under flash light only when this signal is obtained. According to a preferred embodiment in accordance with the present invention, even when the release operation is carried out so that the above mentioned flash light photographic mode setting signal is not obtained, the flash light device does not operate by means of the effect of the safety device so that the camera is automatically set in the state for taking photography under ordinary day light.

36 Claims, 13 Drawing Figures

FLASH LIGHT PHOTOGRAPHIC SYSTEM FOR CAMERA

BACKGROUND OF THE INVENTION

1. Field of the Invention

The present invention relates to a flash light photographic system and more particularly, to a flash light photographic system capable of preventing various improper operations generally apt to take place at the time of taking a photograph by using a flash light device.

2. Description of the Prior Art

Until now, at the time of taking a photograph by using a flash light device, it was often forgotten to set the shutter time at a certain determined shutter time value suited for the flash light photography accordingly, unexpected improper operations took place. For example, when a photograph was taken without noticing that the shutter time was set at a remarkably long shutter time value, the photograph obtained looked like it was oozing. On the other hand, in case a photograph was taken under flash light without noticing that the shutter time was set at a very short shutter time value not suited for the flash light photography and the camera then used was equipped with the so called slit system shutter, such as a focal plane shutter, only a part of the picture was exposed to the flash light. If a long time flash light tube was used, although the camera was equipped with the so called lens shutter an extreme under exposure took place.

Further, it often occurred that the flash light device was mounted on the camera in an incomplete manner or the flash light device was not yet ready for operation even if it was mounted on the camera in an complete manner (same thing can be said of the camera with built-in flash light device). Accordingly the flash light device did not operate at taking photograph so that the pictures obtained were extremely lacked in exposure.

The reason why such failures as mentioned above often took place is that the camera itself could not detect whether the camera was duly set for the flash light photographic mode.

SUMMARY OF THE INVENTION

A purpose of the present invention is to offer a new flash light photographic system capable of preventing all of the above mentioned failures apt to take place in the case of the conventional camera.

Another purpose of the present invention is to compose the flash light photographic system in such a manner that a photograph can be taken only when at least the shutter time is set at a certain determined shutter time value suited for taking a photograph under flash light and the flash light device is set at the state ready for operation.

Further, another purpose of the present invention is to compose the flash light photographic system in such a manner that the camera itself can detect the fact that the camera is set for the flash light photographic mode only when the shutter time is set at a certain determined shutter time value suited for taking a photograph under flash lignt and the flash light device is set in the state ready for operation.

In connection with the above mentioned purpose it is proposed, in accordance with the present invention, to compose the flash light photographic system in such a manner that at the time of taking a photograph under flash light, a signal that the camera is set for the flash light photographic mode is obtained only when the shutter time is set at a certain determined shutter time value suited for taking a photograph under flash light and the flash light device is set at the state ready for operation. In the case of a preferred embodiment in accordance with the present invention, the above mentioned signal of the flash light photographic setting is indicated in the view finder. In the case of another preferred embodiment in accordance with the present invention by means of the signal of the flash light photographic setting the operation circuit of the camera for taking photograph under day light is automatically brought out of the operation while at the same time the state capable of taking photograph under flash light is automatically realized.

Further another purpose of the present invention is to compose the flash light photographic system in such a manner that either when the shutter time is not yet set at a certain determined shutter time value suited for taking photograph under flash light or when the flash light device is not yet ready for operation, the flash light device does not operate at taking a photograph whereby at this time, the operation circuit of the camera at taking photograph under day light is operated in such a manner that the exposure is made by the day light.

Further, it is proposed in accordance with the present invention to provide a lock means by means of which the shutter time setting means is fixed at the position at which the shutter time is set at the determined shutter time value suited for taking photograph under flash light in order that the shutter time set does not change at taking a photograph under flash light.

In the case of a preferred embodiment in accordance with the present invention, the flash light device is set at the state ready for operation in functional engagement with the operation of the above mentioned lock means.

Further, other purposes and features of the present invention will be disclosed from the following explanations in detail as well as the accompanying drawings.

BRIEF DESCRIPTION OF THE DRAWINGS

FIG. 9(a) shows the appearance of the important part of the camera presenting a shutter dial lock means while FIG. 9(b) shows a section through the important part of the above mentioned lock means.

DETAILED DESCRIPTION OF THE PREFERRED EMBODIMENT

The present invention will be explained in accordance with several embodiments of the flash light photographic system in accordance with the present invention according to the accompanying drawings.

Figure 1:
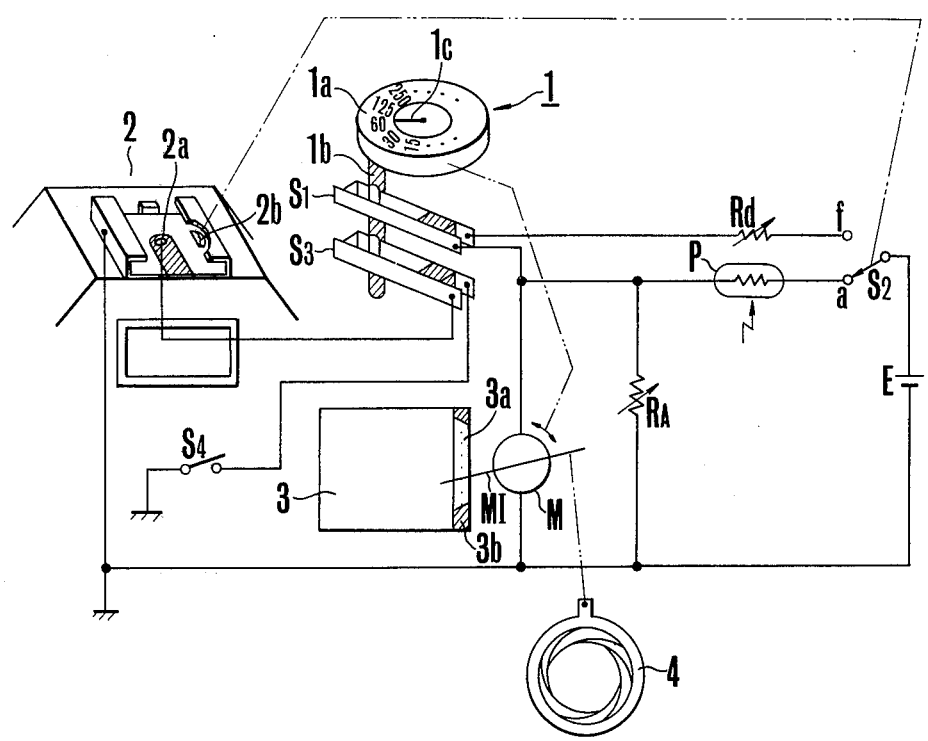
FIG. 1 shows the principle of the important embodiment of the camera in which the flash light photographic system in accordance with the present embodiment is adopted.

FIG. 1 shows principle of the an embodiment of the camera in which the flash light photographic system in accordance with the present invention is adopted whereby in the drawing, 1 is a dial shutter time setting means on which the shutter time scale 1a, the switching over means 1b and the fixed index 1c are provided. 2 is the accessary shoe for mounting the flash light device, on which shoe the connection terminal 2a as well as the detecting means 2b for detecting if the flash light device is mounted. 3 is the view finder, while M is the meter which is so designed that the indication finger $M_1$ of the meter M can be seen in the view finder 3 while the meter M, as a whole can be rotated in accordance with the movement of the shutter time setting dial 1 at the time of setting the shutter time. 4 is the diaphragm device for the photographic lens which is so designed as to be adjusted in accordance with the scale angle of the indication finger $M_1$ of the meter M in a conventional manner. $S_1$ and $S_3$ are the switches which are so designed as to be closed when the shutter time is set at the shutter time value suited for taking a photograph under flash light, $S_2$ the switch which is so designed as to be mechanically respectively or electrically automatically switched over from the terminal $a$ to the terminal $f$ by means of the detecting means 2b when the flash light device has been mounted on the accessary show and $S_4$ the synchronizing switch, which is so designed as to be closed in synchronization with the operation of the shutter not shown in the drawing. RA is the variable resistance for giving the film sensitivity information to the meter M, $Rd$ the variable resistance to be adjusted by the distance adjustment or the guide number setting, whereby the variable resistance $Rd$ is connected with the terminal $f$. P is the light sensing element for measuring the brightness of the object to be photographed, whereby the light sensing element is connected with the terminal $a$. E is the current source. Further, as the flash light device, that of the ordinary type such as is generally sold on the market can be used although such is not shown in the drawing.

Below, the operation of the camera composed as mentioned above will be explained. When first of all a flash light device not shown in the drawing, is mounted on the accessary shoe 2, the flash light device is electrically connected with the camera body by means of the connection terminal 2a while at the same time, the detecting means 2b operates in such a manner that the switch $S_2$ is switched over from the terminal $a$ to the terminal $f$. When then the shutter time setting dial 1 is set at a certain determined shutter time value (for example 1/60 sec.) suited for taking a photograph under flash light, the switches $S_1$ and $S_3$ are closed. Thus only when the flash light device is mounted on the camera and the shutter time is set at the determined shutter time value suited for taking a photograph under flash light, the circuit consisting of the current source E, the resistance $Rd$ and the meter M is closed, whereby the meter M decides the diaphragm value corresponding to the distance of the object to be photographed, being given the film sensitivity information by the resistance RA, so as to indicate the value by means of the indication finger $M_1$ in the view finder 3 and to adjust the diaphragm device 4 at the decided diaphragm value.

When then the release member not shown in the drawing, of the camera is operated so as to operate the shutter, the synchronizing switch $S_4$ is closed so that the flash light device is operated in a conventional manner to complete photography under flash light.

In case, on the other hand, the flash light device is mounted while the shutter time is not set at the determined shutter time value suited for taking a photograph under flash light, the flash light device is not in a position to operate because both of the switches $S_1$ and $S_3$ remain opened, while the circuit of the meter M is not closed and therefore out of operation because although the switch $S_2$ is connected with the terminal $f$, the switch $S_1$ remains opened so that the indication finger $M_1$ of the meter M indicates in the view finder the alarm that the camera is not yet ready for taking photograph under flash light. This indication of the alarm can be obtained easily, for example, by composing an alarm zone out of a part 3b of the view finder frame 3a which corresponds to a point at which the meter M does not work.

In this case the above mentioned alarm indication is made by means of a conventional means, and it is sufficient to compose in such a manner that the operation of the release is prevented in case of the alarm indication in order to avoid the undesired shutter operation or the undesired film consumption when the diaphragm is out of the range of the functional engagement (the adjustable range of the diaphragm) at the time of taking a photograph under day light or flash light.

When a photograph is taken under day light without the flash light device, the switch $S_2$ is connected with the terminal $a$, the meter M decides the diaphragm value for obtaining a proper exposure based upon the information of the brightness of the object to be photographed due to the output of the light sensing element P, the sensitivity information of the film due to the variable resistance RA and the information of the shutter time set by means of the shutter time setting dial 1, whereby the decided diaphragm value is indicated by means of the indication finger $M_1$ in the view field of the view finder 3 while the diaphragm device 4 is set at the decided diaphragm value. Hereby, the information of the shutter time is put in the meter M by rotating the meter M as a whole in accordance with the movement of the shutter time setting dial 1 as is mentioned above, whereby it goes without saying that it is also possible by means of an electrical means such as variable resistance.

Figure 2:
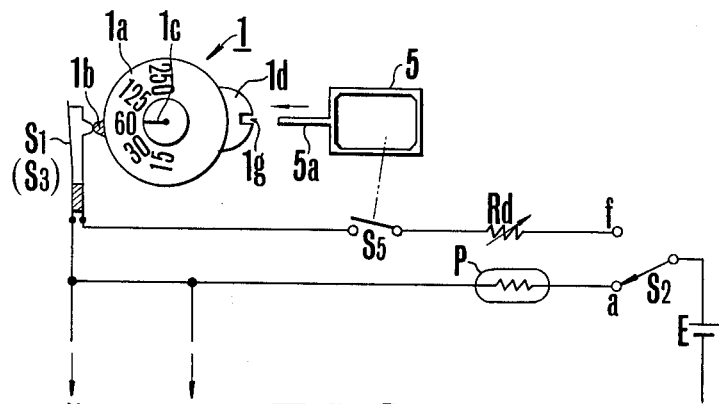
FIG. 2 shows the principle of only the improved part of an improvement of the camera shown in FIG. 1, whereby the shutter time setting means can be fixed at the position at which the shutter time is set at a certain determined value suited for taking a photograph under flash light.

FIG. 2 shows a partially improved embodiment of the camera shown in FIG. 1 whereby the shutter time setting dial can be fixed at the position at which the shutter time is set at the determined shutter time value suited for taking photograph under flash light. Below the composition will be explained. The composition and the effects of the elements presenting the the same figures as in FIG. 1 are same as those shown in FIG. 1, whereby further other elements not shown in the drawing are composed in a same manner as those in FIG. 1. In the drawing, $1d$ is the engaging member provided on the shutter time setting dial 1 presenting a concave part $1g$, 5 the shutter dial lock means presenting a projecting arm $5a$ engageable in the concave part $1g$ of the engaging member $1d$ and $S_5$ a switch being connected in series with the above mentioned switch $S_1$ and opened and closed in accordance with the movement of the above mentioned shutter dial lock means 5.

How to use the camera so composed as mentioned above is as follows. When at first the shutter time is set at the determined shutter time value suited for taking photograph under flash light, by rotating the shutter time setting dial 1, the switches $S_1$ and $S_2$ are closed by means of the switching over means $1b$ while the concave part $1g$ of the engaging member $1d$ is brought into a position at which the projecting arm $5a$ of the shutter dial lock means 5 is engageable in the concave part $1g$. When therefore, in this state the shutter dial lock means 5 is moved along the direction of the arrow in the drawing in such a manner that the projecting arm $5a$ is engaged in the concave part $1g$ of the above mentioned engaging member $1d$, the shutter time setting dial 1 is fixed at this position, so that the unexpected change of the shutter time at the time of taking photograph can be avoided. Further at this time, the switch $S_5$ is closed in functional engagement of the shutter dial lock means 5. Consequently, only when at the time of taking photograph the flash light device is mounted on the camera, is the shutter time set at the determined shutter time value suited for taking photograph under flash light and the shutter time setting dial 1 is locked at this position, the circuit of the meter M is closed and it becomes possible to take photograph under flash light. In case therefore, the shutter time is set at the shutter time value suited for taking photograph under flash light while it is forgotten to lock the shutter time setting dial 1, the meter M does not operate because the circuit of the meter M is not closed, so that it is indicated as alarm by means of the indication finger $M_1$ of the meter that the locking operation is neglected.

The explanations of other operations are omitted because they are completely the same as in case of FIG. 1.

Figure 3:
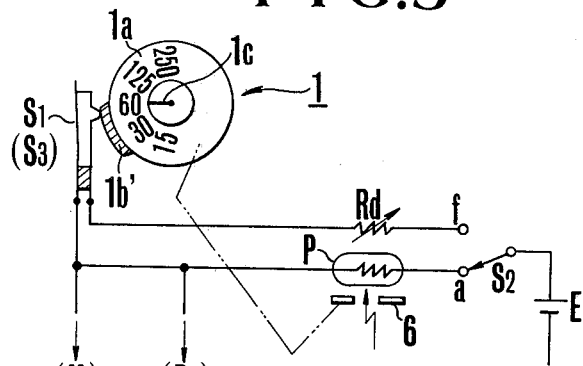
FIG. 3 shows the principle of only the improved part of another improvement of the camera shown in FIG. 1, whereby the shutter time value suited for taking a photograph under flash light can be chosen from a range instead of only one value.

FIG. 3 shows another improved embodiment of the camera shown in FIG. 1, whereby it is so designed that the shutter time value suited for taking a photograph under flash light is not a single value but can be selected from a certain range. Below, the composition will be explained. The compositions and the effects of the elements presenting the same figures as in FIG. 1 are same as those shown in FIG. 1, whereby further other elements not shown in the drawing are composed in the same manner as those in FIG. 1. In the drawing, $1b'$ is a switching over member being provided on the shutter time setting dial 1 or in functional engagement therewith whereby the switching over means $1b'$ is so constructed as to be able to close the switches $S_1$ and $S_3$ not at a single value of the shutter time but in a certain range for example, between 1/15 sec. and 1/60 sec., 6 is the diaphragm member being provided in front of the light sensing face of the light sensing element P and functionally engaged with the shutter time setting dial 1, so as to be able to adjust the effective amount of the light beam reaching the light sensing element P, whereby, by means of so constructed diaphragm member 6, the information of the shutter time is put in the diaphragm control system of the camera at the time of taking photograph under day light. In this case, the shutter time setting dial is not functionally engaged with the body of the meter M.

The operation of the so constructed camera is almost same as that in FIG. 1, so that the detailed explanation thereof is omitted.

Figure 4:
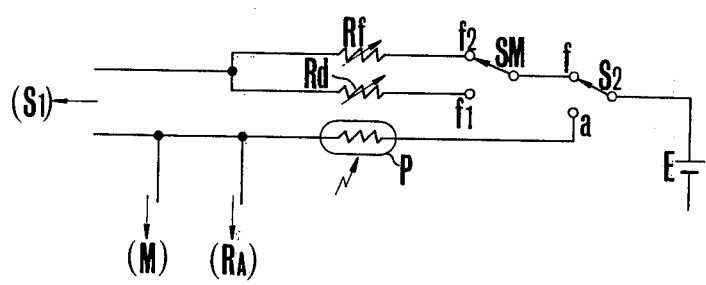
FIG. 4 shows the principle of only the improved part of another further improvement of the camera shown in FIG. 1 whereby as the flash light device both of the light adjustable speed light device and the light non-adjustable speed light device can be used.

FIG. 4 shows further another improvement of the camera shown in FIG. 1, whereby as the flash light device both of the light adjustable speed light and the light non-adjustable speed light can be used. Below the construction will be explained. The compositions and the effects of the elements presenting the same figures as in FIG. 1 are same as those in FIG. 1, whereby further other elements not shown in the drawing are composed in a same manner as those in FIG. 1. In the drawing, SM is a switch which can be manually switched over between the terminals $f_1$ and $f_2$, whether the adopted flash light device is of the light adjustable type or of the light non-adjustable type, whereby the variable resistance $Rd$ is connected between the terminal $f_1$ and the switch $S_1$, while between the terminal $f_2$ and the switch $S_1$ a variable resistance $Rf$ is connected, which resistance can be manually adjusted based upon the diaphragm value decided in accordance of the level of the flash light amount of the light adjustable type speed light.

Therefore, the switch SM is connected with the terminal $f_1$ at the time of using a light non-adjustable type speed light as flash light for the camera constructed as mentioned above. By doing so, a circuit similar to that for the camera shown in FIG. 1 is formed at the time of taking photograph under flash light in such a manner that the same operation as of the camera shown in FIG. 1 is made at the time of taking a photograph.

In case on the other hand, a light adjustable type speed light is used as flash light the switch SM is connected with the terminal $f_2$ while the variable resistance $Rf$ is set at a diaphragm value decided in accordance with the level of the flash light amount of the above mentioned speed light. By doing so, the circuit consisting of the current source, the resistance $Rf$ and the meter M is closed at the time of taking photograph under flash light whereby the meter decides the photographic diaphragm value in accordance with the above mentioned diaphragm value, the information of the film sensitivity being put in the resistance RA. The operation after the above is same as in case of the previous embodiment.

Figure 5:
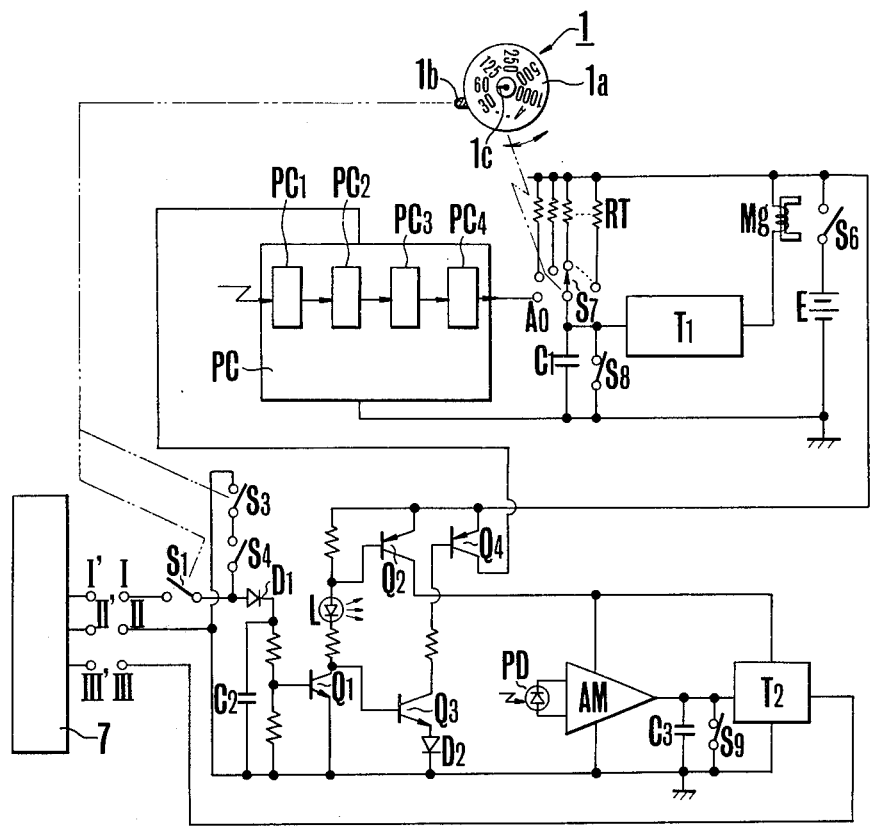
FIG. 5 shows especially the exposure control circuit of another embodiment of the camera in which the flash light photographic system in accordance with the present invention is adopted.

FIG. 5 shows especially the exposure control circuit of further another embodiment of the camera in which the flash light photographic system in accordance with the present invention is adopted, whereby the camera shown here is that with the priority in diaphragm suited to be used with the light adjustable speed light. Below the construction will be explained. The compositions and the effects of the elements presenting the same figures as in FIG. 1 are same as those in FIG. 1. In the drawing, PC is the light measuring circuit consisting of a light sensing circuit $PC_1$ presenting a light sensing element for measuring the brightness of the object to be photographed, the compressing circuit $PC_2$, the storage circuit $PC_3$ and the prolongation circuit $PC_4$, whereby the output terminal Ao of the light measuring circuit PC is connected with a contact piece of the switching over means $S_7$ being brought into functional engagement with the shutter time setting dial 1 only when the shutter time is set at "A" (automatic). RT is a resistance to be switched over by means of the above mentioned switching over means $S_7$ in accordance with the shutter time value set when the shutter time is manually chosen. $C_1$ is the timing condenser being connected with the above mentioned switch $S_7$, $S_8$ is the count starting switch to be opened in synchronization with the start of the shutter not shown in the drawing, whereby the switch $S_8$ is connected in parallel to the condenser $C_1$. $T_1$ is the switching circuit, whereby the operation voltage level of the switching circuit $T_1$ is set in accordance with the film sensitivity information as well as the diaphragm information. Mg is a magnet to be operated by means of the above mentioned switching circuit $T_1$, while $S_6$ is the switch of the current source whereby the shutter control circuit consists thereof. $D_1$ is the diode, $Q_1$ the transistor, $C_2$ the holding condenser for preventing the transistor from being instantly brought into non conductive state when the flash light device operates and L the indication luminous body such as illuminant diode (LED), whereby the indication circuit consists thereof. Hereby it is preferred that the indication luminous body L is provided in such a manner that the its illuminating state can be recognized in the view finder.

$Q_2$ is the transistor, PD the light sensing element for sensing the light beam reflected from the object to be photographed, of the flash light device, AM the amplifier, $C_3$ the integrating condenser, $S_9$ the switch to be opened in synchronization with the closure of the above mentioned switch $S_4$ and $T_2$ the switching circuit whereby the light adjusting circuit for the flash light device consists thereof.

The operation voltage level of the switching circuit $T_2$ is set in accordance with the film sensitivity information as well as the diaphragm information as is the case with the above mentioned switching circuit $T_1$.

7 is the flash light device (for the present embodiment a light adjustable speed light is suited), whereby the flash light device presents the terminals I', II' and III' to be connected with the terminals I, II and III at the camera side.

Hereby the transistors $Q_1$, $Q_2$, $Q_3$ and $Q_4$ are connected with each other so as to control the switching over of the operation state and the non-operation state of the above mentioned light measuring circuit PC, the indication circuit and the light adjusting circuit.

Below the operation of the camera composed as mentioned above will be explained. At the time of taking photograph under flash light at first the switch $S_6$ of the current source is closed, the flash light device is electrically connected with the camera by means of the connection terminals I, II and III and the corresponding terminals I', II' and III' and the shutter time is set at the shutter time value suited for taking photograph under flash light by operating the shutter time setting dial 1. By doing so, the switches $S_1$ and $S_2$ are closed while the switching over means connectes the resistance in accordance with the value set by means of the dial 1 in such a manner that the shutter is now in a position to operate with the above mentioned set time. When then the flash light device 7 is ready for operation, a voltage take place between the terminals I' and II' (in a manner to be explained in accordance with FIG 6) so that the condenser $C_2$ is charged by means of the diode $D_1$, while the transistor $Q_1$ becomes conductive. Thus the luminous body 1 illuminates so as to indicate that the camera as well as the flash light device is ready for taking photograph under flash light.

When further the transistor $Q_1$ becomes conductive, the transistor $Q_2$ also becomes conductive so that the above mentioned light adjusting circuit is put in the operation state while the transistor $Q_3$ becomes non-conductive so that the transistor $Q_4$ becomes non-conductive, so as to interrupt the current supply to the light adjusting circuit PC.

Then in synchronization of the operation of the shutter by means of the release operation the synchronizing switch $S_4$ is closed so that the flash light device 7 operates. (At this time, the switch $S_9$ is opened in synchronization of the closure of the switch $S_4$, whereby the transistor does not return to non conductive state due to the effect of the condenser $C_2$ immediately when the flash light device 7 operates.) The light beam projected from the flash light device 7 and reflected by the object to be photographed reaches the light sensing element PD, when the output of the light sensing element PD is integrated by means of the amplifier AM and the condenser $C_3$. As soon as the charge voltage of the condenser $C_3$ reaches the operation voltage level of the switching circuit $T_2$ the switching circuit $T_2$ operates so as to give an operation stop signal to the flash light device 7 through the terminals III—III'. Thus the flash light device 7 stops its operation and then the shutter is closed so as to complete the flash light photography. Further it is possible to replace the contact piece as the above mentioned switch $S_9$ with a semi-conductor switch as is used in the ordinary light adjusting circuit, whereby further it is possible to add a shutter dial lock means as is shown in FIG. 2 or to compose the switching over means 1b as is shown in FIG. 3.

Below the photography under day light will be explained. At the time of taking photograph with the shutter set at automatic at first the switch $S_6$ of the current source is closed while the shutter time setting dial 1 is set at the position "A" (automatic). Thus the switching over switch $S_7$ is connected with the output terminal Ao of the light measuring circuit PC so that the shutter time is automatically controlled by means of the output of the light measuring circuit PC. Further, by closing the switch $S_6$ of the current source the transistor $Q_3$ becomes conductive so that the transistor $Q_4$ becomes conductive so as to supply current to the light measuring circuit PC. On the other hand, both of the transistor $Q_1$ and $Q_2$ are non-conductive at this time, so that the above mentioned indication circuit as well as the above mentioned light adjusting circuit are out of operation. When in this state, the release is operated the shutter control circuit operates in a conventional manner so that the shutter time is automatically controlled in accordance with the brightness of the object to be photographed so as to obtain a proper exposure. When the shutter time setting dial 1 is moved from the position "A" to a certain desired shutter time the switching over means $S_7$ is connected with the desired one of the switching over resistance RT in functional engagement with the shutter time setting dial 1, so that also the manual control of the shutter time becomes possible.

Figure 6:
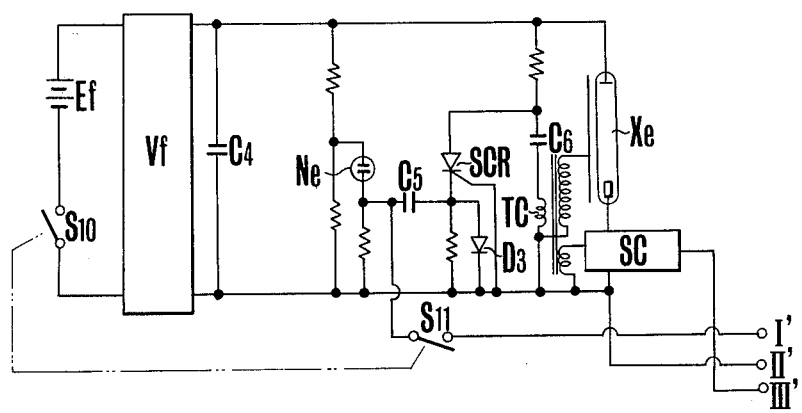
FIG. 6 shows the electric circuit for an embodiment of the flash light device suited to be used in the camera presenting such an exposure control circuit as is shown in FIG. 5.

FIG. 6 shows an embodiment of the electric circuit of the flash light device 7 suited to be used for the camera composed as is shown in FIG. 5. In the drawing, Ff is the current source for the flash light device, $S_{10}$ the main switch, Vf the voltage step up rectifying circuit, $C_4$ the main condenser, and $C_5$ and $C_6$ the condensers for the trigger circuit whereby these condensers $C_4$, $C_5$ and $C_6$ are charged by means of the voltage step up rectifying circuit Vf. (Hereby the condenser $C_5$ starts to be charged after the neon tube Ne for indication purpose illuminates.) SCR is the thyristor, TC is the trigger coil, SC the switching circuit for controlling the amount of the flash light, Xe the flash light discharge tube and $S_{11}$ the safety switch closed and opened in functional engagement of the above mentioned main switch $S_{10}$.

The operation of the flash light device composed as mentioned above when it is used with the camera composed as shown in FIG. 5 is as follows. What at first the main switch $S_{10}$ is closed while the switch $S_1$ and $S_3$ are kept closed, by electrically connecting the flash light device with the camera while the shutter time is set at the shutter time value suited for taking photograph under flash light at the camera side, the main condenser $C_4$ and the condenser $C_6$ start to be charged. When the main condenser $C_4$ has been sufficiently charged in such a manner that the neon tube Ne illuminates, the condenser $C_4$ starts to be charged while a voltage takes place between the terminals I' and II'. (The safety switch $S_{11}$ connected with the terminal I' is in functional engagement with the main switch $S_{10}$, so that it is closed at the same time with the closure of the main switch $S_{10}$.) Thus as is already mentioned in the explanation of FIG. 5 the indication circuit at the camera side operates in such a manner that the luminous body L indicates that the camera as well as the flash light device is ready for taking photograph while the light adjusting circuit is brought into operation state and the current supply to the light measuring circuit PC is interrupted.

When in this state, the release is operated the synchronizing switch $S_4$ is closed in synchronizing the operation of the shutter, so that the condenser $C_5$ discharges while the potential at the cathode of the thyristor SCR becomes lower than that at the gate in such a manner that the thyristor SCR becomes conductive. Thus the charge in the condenser $C_6$ is discharged through the thyristor SCR and the trigger coil TC in such a manner that the switching circuit SC for controlling the amount of the flash light is brought in the operation state, while the flash light discharge tube Xe operate. The flash light given from the flash light discharge tube Xe and reflected by the object to be photographed reaches the light sensing element PD in the light adjusting circuit at the camera side in such a manner that the switching circuit $T_2$ in the above mentioned light adjusting circuit gives out a flash light stop signal as soon as the amount of the flash light projected by the flash light discharge tube Xe reaches a certain determined level whereby the above mentioned signal is sent to the switching circuit SC for controlling the amount of the flash light in the flash light device through the terminals III - III'. The above mentioned switching circuit SC stops the operation of the flash light discharge tube Xe by means of the flash light stop signal.

When as explained above, the flash light device composed as is shown in FIG. 6 is used with the camera composed as is shown in FIG. 5, a very sure flash light photography can be realized.

When namely at the time of taking photograph under flash light either of the setting of the shutter time at the determined shutter time value suited for taking photograph under flash light, or the connection of the flash light device with the camera or the charging of the main condenser of the flash light device is forgotten the indication circuit at the camera side does not work and therefore the luminous body L does not illuminate, so as to alarm that the flash light photography is impossible because it is not yet ready. Even if the release is operated, ignoring the above alarm, the flash light device does not operate while the camera automatically takes photograph under day light.

In case, for example, the shutter timme is not set at the determined shutter time value although the camera has been electrically connected with the flash light device and the main condenser has been sufficiently charged, the switch $S_3$ remains opened and therefore, even if the switch $S_4$ is closed in synchronization with the operation of the shutter by means of the release operation, the condenser $C_5$ does not discharge so that the flash light discharge tube Xe does not illuminate while the camera takes photograph under day light. Further, the switch $S_1$ remains opened at this time, the voltage taking place between the terminals I' and II' when the neon tube Ne of the flash light device illuminates is not applied to the transistor $Q_1$ and therefore the transistors $Q_1$ and $Q_2$ remain in non conductive state, so that the indication circuit at the camera side as well as the light adjusting circuit does not operate while on the other hand, thus the transistors $Q_3$ and $Q_4$ remain in the conductive state so that the light measuring circuit PC is in operation and therefore when the shutter time is set at "A" a proper exposure in accordance with the brightness of the object to be photographed can be obtained. When the connection between the camera and the flash light device is not complete the voltage taking place between the terminals I' and II' when the neon tube Ne illuminates is not applied to the transistor Q even if the main condenser is sufficiently charged and the shutter time is set at the determined shutter time value and therefore the camera is in a position to take photograph with the day light photographic mode. It goes without saying that also in this case, the flash light discharge tube does not operate. When further the main condenser of the flash light device is not charged sufficiently the camera is still in the day light photographic mode even if the shutter time is set at the determined shutter time value and the connection between the camera and the flash light device is complete whereby even if the release is operated the flash light discharge tube does not operate in this state and the photograph is taken under day light.

From the above it can be understood that the day light photography can freely be realized while the flash light device remains connected with the camera or the main condenser remains sufficiently charged. Namely, when the flash light device is mounted on the camera while its main condenser is not all or not sufficiently charged the camera is in a position to take photograph with any shutter time including the determined shutter time for taking photograph under flash light while when the main condenser of the flash light device connected with the camera is sufficiently charged the camera is in a position to take photograph under day light freely without operating the flash light device so far as the shutter time is set at other shutter time values than that determined for taking photograph under flash light.

Figure 7:
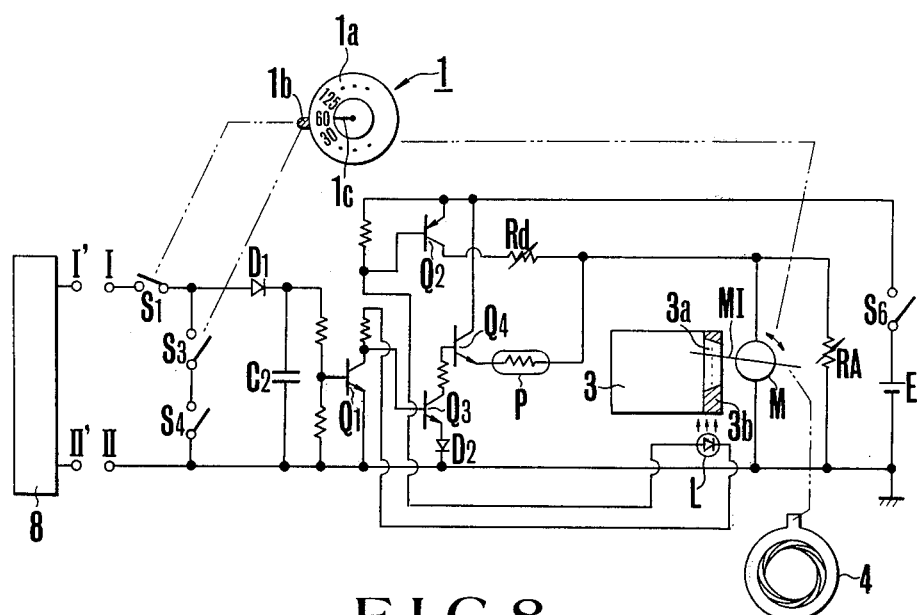
FIG. 7 shows especially the exposure control circuit for another further embodiment of the camera in which the flash light device in accordance with the present invention is adopted.

FIG. 7 shows especially the exposure control circuit of further another embodiment of the camera in which the flash light system in accordance with the present invention is adopted. The camera shown here is the one with the so called priority in shutter which is designed so as to be suited for being used with the light non adjustable speed light. Below the composition will be explained. The compositions and the effects of the elements presenting the same figures as those shown in FIG. 1 and FIG. 5 is same as those in FIG. 1 and FIG. 5. Namely, the circuit shown in FIG. 1 and FIG. 5 consists of the combination of the diaphragm control circuit shown in FIG. 1 and the indication circuit for the flash light photography shown in FIG. 5, whereby the variable resistance Rd is connected with the switch $S_6$ of the current source through the transistor $Q_2$ while the light sensing element P is connected with the switch $S_6$ of the current source through the transistor $Q_4$. Consequently when the transistor $Q_1$ is conductive so that the transistor $Q_2$ is conductive (in this case both of the transistors $Q_3$ and $Q_4$ are non conductive) the circuit consisting of the current source E, the variable resistance Rd and the meter is closed while when the transistor $Q_3$ is conductive so that the transistor $Q_4$ is conductive (in this case both of the transistors $Q_1$ and $Q_2$ are non conductive), the circuit consisting of the current source E, the light sensing element P and the meter M is closed. 8 is a flash light device (the light non-adjustable speed light is suited for the present embodiment) which is electrically connected with the camera through the terminals I-I' and II-II'. Further the luminous body L for the indication purpose is provided so as to be recognized in the view finder.

Figure 8:
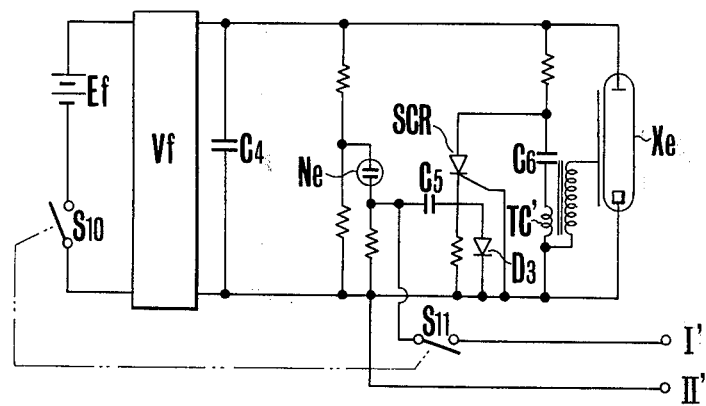
FIG. 8 shows the electric circuit for an embodiment of the flash light device suited to be used in the camera presenting such an exposure control circuit as is shown in FIG. 7.

FIG. 8 shows the electric circuit diagram of an embodiment of the flash light 8 shown in FIG. 7. The compositions and the effects of the members presenting the same figures as those shown in FIG. 6 are the same as those in FIG. 6. Namely, the flash light device shown in FIG. 8 represents the compositions of the flash light device shown in FIG. 6, whereby the switching circuit SC for controlling the amount of the flash light and the terminal III' are eliminated. TC' is the trigger coil.

The operation of the flash light device as is shown in FIG. 8 where it is mounted on the camera as is shown in FIG. 7 is as follows. At first, the flash light device is electrically connected with the camera by means of the terminals I-I' and II-II' while the switch $S_6$ of the current source at the camera side and the shutter time is set at a certain determined shutter time value for taking photograph under flash light. Thus the switches $S_1$ and $S_2$ are closed. Then by closing the main switch $S_{10}$ at the flash light device side the main condenser $C_4$ and the condenser $C_6$ start to be charged by means of the voltage step up rectifying circuit Vf. When the main condenser $C_4$ is sufficiently charged and the neon tube Ne illuminates a voltage takes place between the terminals I' and II' as explained above in such a manner that the transistor $Q_1$ at the camera side becomes conductive and the luminous body L illuminates, whereby it is indicated in the view finder that it is ready for the flash light photography. Further, at this time, the transistor $Q_2$ is conductive and therefore the circuit consisting of the current source E, the variable resistance Rd and the meter is closed whereby the meter M decides the diaphragm value basing upon the information of the shutter time, the information of the film sensitivity and the distance information of the object to be photographed so as to indicate the diaphragm value in the view finder by means of its indication finger $M_1$, at the same time setting the diaphragm device 4 in accordance with the decided diaphragm value. When the release is operated in this state, the switch $S_4$ is closed in synchronization with the operation of the shutter not shown in the drawing so that the flash light device operates. After then the shutter closes in the determined so as to complete the exposure.

Further, at the time of the operation of the flash light discharge tube Xe the voltage between the terminals I and II disappears whereby the condenser $C_4$ discharges by the closure of the switch $S_4$ and therefore the transistor $Q_1$ remains in a conductive state for a little so that also the transistor $Q_2$ remains in a conductive state in such a manner that even if the discharge tube Xe has operated the switching over of the connection between the variable resistance Rd and the light sensing element P toward the meter M is prevented whereby the circuit consisting of the current source E, the variable condenser Rd and the meter M remains closed so as to avoid the change of the photographic diaphragm value.

As explained above in case of taking photograph under flash light it is indicated that the flash light photography is possible only when as in case of the above mentioned embodiment all the operation such as the setting of the shutter time at the determined shutter time value for taking photograph under flash light, the connection of the flash light device with the camera and the preparation of the flash light device have been completed whereby when any one of the above mentioned operations has not been completed yet, it is impossible to take photograph under flash light while also the luminious body L for indication purpose does not illuminate, so as to make an alarm. Even if further the release is operated while the preparation for taking photograph under flash light is still incomplete the flash light device does not illuminate as in case of the above mentioned embodiment, whereby the camera is in a position to take photograph under day light automatically. (The operation at this time is almost same as that in case of the above mentioned embodiment). When further at the time of taking photograph under day light the switch $S_6$ of the current source is closed, the transistors $Q_3$ and $Q_4$ becomes conductive and therefore the circuit consisting of the current source E, the light sensing element P and the meter M is closed in such a manner that as in case of the embodiment shown in FIG. 1, the diaphragm value is decided basing upon the information of the shutter time, the information of the film sensitivity and the information of the brightness of the object to be photographed, whereby the diaphragm device is automatically set in a corresponding manner.

Figure 9:
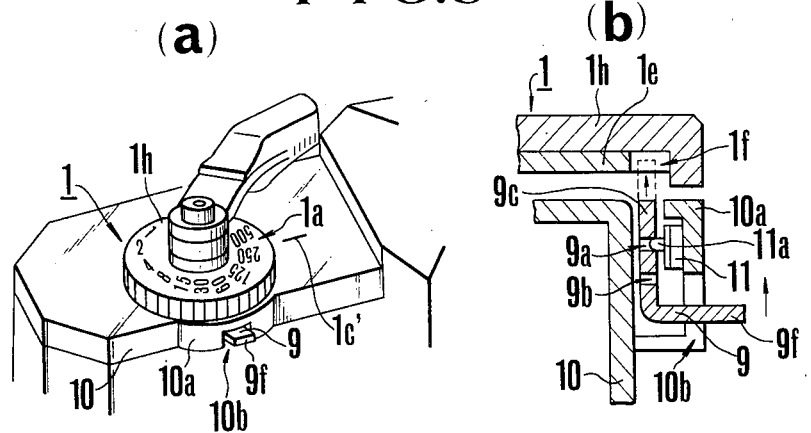
FIG. 9 shows the important part of an embodiment of the camera composed in accordance with the improvement shown in FIG. 2, whereby

Below the concrete embodiment of the shutter dial lock means shown in FIG. 2 will be explained. FIG. 9 (a) shows the partial appearance of the camera which is equipped with the shutter dial lock means shown in FIG. 9 (a), whereby the shutter time setting dial 1 is so designed that a desired shutter time can be obtained by coinciding the shutter time scale 1a with the fixed index 1c'. 9 is the shutter dial lock member, 10 the camera housing, 10a the projecting part and 10b the notch in the projecting part 10a.

FIG. 9(b) shows a partial section for showing the internal construction of the shutter dial lock means shown in FIG. 9(a). In the drawing, 1e is a disc presenting a notch 1f and so constructed as to be rotatable as one body with external frame 1h of the shutter time setting dial 1, 9a and 9b the click holes provided in the shutter dial lock member 9, 11 the engaging member presenting a click pin 11a engageable in the above mentioned click holes 9a and 9b, whereby the click pin 11a is forcced by means of a spring member not shown in the drawing along a direction for engaging in the above mentioned click holes 9a and 9b. Hereby the shutter dial lock member 9 is bent in form of L, whereby the one end 9f projects out of the front face through the opening 10b of the housing so as to be operated from outside. Further, the notch 1f in the disc 1e is provided at a position at which the end 9c of the shutter dial lock member 9 is engageable in the notch 1f, when the shutter time is set at a certain determined shutter time value suited for taking photograph under flash light.

At the time of using the shutter dial lock means constructed as mentioned above at first the shutter time setting dial 1 is rotated so as to be coincided with the index 1c' of the determined shutter time value for taking photograph under flash light. Thus the notch 1f of the disc 1e comes to the position at which the end 9c of the shutter dial lock member 9 is engageable in the notch 1f. When in this state the lock member 9 is pushed up along the direction of the arrow the click pin 11a is brought out of the engagement with the click hole 9a and when the end 9c of the lock member 9 enters into the notch 1f of the disc 1e the click pin 11a falls into the click hole 9b so as to secure the lock member 9. Thus the shutter time setting dial 1 is fixed at the position so far as the lock member 9 is secured in such a manner that it is prevented that the shutter time setting dial is unexpectedly moved so as to change the shutter time.

Figure 10:
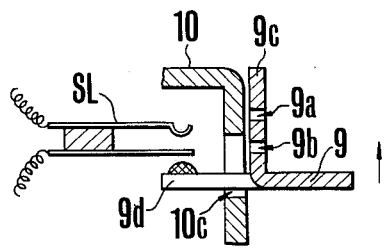
FIG. 10 shows a section of the important part of an improvement of the camera presenting the above mentioned shutter dial lock means whereby, by means of the operation of the above mentioned lock means, the switch means taking part in the above mentioned flash light photographic system can be switched on or off.

FIG. 10 shows an embodiment of the camera which is so designed that the switch taking part in the flash light photographic system is opened and closed in functional engagement with the operation of the above mentioned lock member 9, whereby the lock member 9 presents an arm 9d projecting into the inside of the camera through the opening 10c of the camera housing 10 in such a manner that the projecting arm 9d opens and closes the switch SL taking a part of the flash light photographic system in accordance with the lock member 9. When namely the shutter time setting dial is secured by pushing up the lock member along the direction of the arrow the switch SL is closed by means of the projecting arm 9d while the switch SL remains opened when the lock member 9 is not operated. When this switch SL is used as the switch $S_5$ shown in FIG. 2, the meter or the indication device does not work at the time of taking photograph under flash light unless the lock member is not operated and therefore, it is prevented to forget the lock operation. When further this switch SL is used instead of the switch $S_3$ shown in FIG. 5 and FIG. 7, or in series therewith, it is possible to take photograph under day light with the shutter time for taking photograph under flash light while the flash light device ready for operation remains mounted on the camera. Namely, in case a photograph is taken under day light with the shutter time for taking photograph under flash light, even if the flash light device mounted on the camera is ready for operation the switch SL remains opened unless the lock operation is not made in such a manner that it is possible to take photograph under day light without the operation of the flash light device in case the release is operated without the lock operation.

Figure 11:
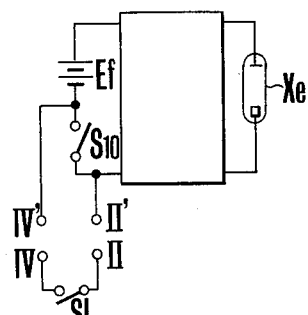
FIG. 11 shows the electric circuit diagram for showing the connection between the switch means shown in FIG. 10 and the flash light device whereby, by means of the switch means, the flash light device can be set at the state ready for operation.

In case hereby, the above mentioned switch SL is constructed, as shown in FIG. 11, so as to be connected in parallel with the main switch $S_{10}$ of the flash light device at the time of connecting the flash light device with the camera, even if the main switch $S_{10}$ of the flash light device is not closed the switch SL is closed in case the shutter time setting dial 1 is locked at the position at which the shutter time is set at the determined shutter time value for taking photograph under flash light, so that the flash light device becomes automatically ready for operation. Namely, the flash light device becomes automatically ready for operation by setting the flash light photographic mode at the camera side. However, in case of a flash light device presenting a safety switch $S_{11}$ in functional engagement with the main switch $S_{10}$ as is shown in FIG. 6 and FIG. 8, it is necessary to functionally engage with this safety switch $S_{11}$ with the switch SL.

Figure 12:
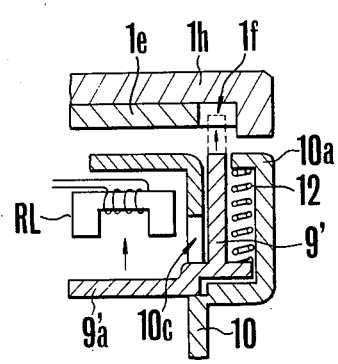
FIG. 12 shows a partial section through the important part of the camera which is so designed that the operation for locking the shutter time setting means at the position at which the shutter time is set at a certain shutter time value suited for taking photograph under flash light can be electrically carried out.

FIG. 12 shows an embodiment so constructed that the shutter time setting dial is locked electrically. In the drawing, 9' is the lock member presenting an arm 9'a projecting into the inside of the camera through the opening 10c of the camera housing 10, 12 the spring for pushing down the above mentioned lock member 9' into the non operation position, and RL the relay whereby in case the relay RL is excited the projecting arm 9'a of the lock member 9' is attracted so that the lock member 9' is pulled upwards against the strength of the spring 12. When this relay RL is connected in series with for example, the luminous body L for indication purpose as is shown in FIG. 5 to FIG. 7, the lock member 9 can be operated only when it has been prepared to take photograph under flash light so that at the time of taking photograph under flash light in a dark place, it is possible to set the shutter time at the determined shutter time value for taking photograph under flash light by simply rotating the dial correspondingly without looking at the shutter time scale of the shutter time setting dial and to judge whether it has be prepared to take photograph under flash light by checking whether the lock operation has been made or not.

Hereby, the switch SL can be so constructed as to be opened and closed by the projecting arm 9'a as is shown in FIG. 10.

Figure 13:
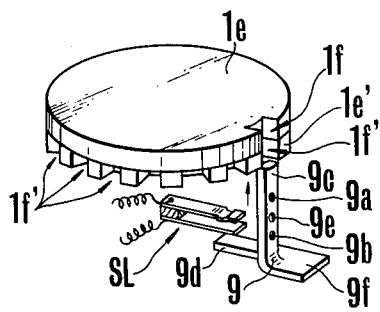
FIG. 13 shows the important part of the shutter dial lock means in perspective view whereby the shutter time setting means can be locked at any position at which the shutter time is set at any shutter time value suited for taking photograph under flash light while especially in functional engagement of the operation for locking the shutter time setting means at the position at which the shutter time is set at the shutter time value suited for taking photograph under flash light the switch member can be switched on or off.

FIG. 13 shows a shutter time setting dial 1, which is so designed that the shutter time setting dial can be locked at any position at which the shutter time is set at same shutter time value while the above mentioned SL taking part in the flash light system can be opened and closed in functional engagement with the locking operation of the dial 1 at the position at which the shutter time is set at the shutter time value for taking photograph under flash light, whereby as one body with the above mentioned disc 1e the second disc 1e' presenting notches 1f' at each position corresponding to each of the shutter time value to be selected by means of the shutter time setting dial 1 is provided, while the above mentioned lock member 9 presents the third click hole 9e besides the two click holes 9a and 9b.

Consequently, by operating the lock member 9 so as to put the end 9c into the notch 1f' of the second 9c (at this time, the click pin 11a shown in FIG. 9(b) goes out of the click hole 9a and enters into the click hole 9e), the shutter time setting dial 1 can be locked at any position at which the shutter time is selected. This is very profitable at the time of taking photograph under day light especially by means of the motor driving device.

In case on the other hand, at the time of taking photograph the shutter time is set at the determined shutter time value for taking photograph under flash light the notch 1f of the disc 1e comes to a position at which the end 9c of the lock member 9 engages in the notch 1f of the disc 1e. Thus by operating the lock member 9 at this position so as to introduce the end 9c into the notch 1f of the disc 1e (at this time the click pin 11a shown in FIG. 9(b) goes out of the click hole 9a and enters into the click hole 9b), the shutter time setting dial 1 can be locked at the position at which the shutter time is set at the shutter time value for taking photograph under flash light while at this time, the above mentioned switch SL can be closed by means of the projecting arm 9d of the lock member 9.

In case hereby the end 9c of the lock member 9 is only introduced in the notch 1f' of the disc 1e' when the shutter time is set at the shutter time value for taking photograph under flash light, the above mentioned switch SL is not closed in such a manner that it is possible to take photograph under day light without operating the flash light device even if the flash light device has been ready for operation.

As explained above, in case of the flash light photographic system in accordance with the present invention, at the time of taking photograph under flash light the camera itself automatically detects whether the camera is duly set for the flash light photographic mode so that various shortcomings mentioned above in case of the conventional camera can be eliminated so as to be able to obtain good pictures at any time whereby the effect is remarkable. In case of an especially preferred embodiment of the present invention, the result of the detection whether the camera as well as the flash light device is set for the flash light photographic mode is indicated in the view finder so that by simply looking through the view finder it is possible to learn whether the camera as well as the flash light device has been duly set for the flash light photographic mode, whereby it can be said that the operationability of the camera is remarkably improved not only for the flash light photography but also for the day light photography. Further the cameras in the embodiments are designed in such a manner that at the time of taking photograph under flash light, the circuit for taking photograph under day light is automatically brought out of operation while at the time of taking photograph under day light the circuit for taking photograph under flash light is automatically brought out of operation so that in any case the waste of the electric energy can be avoided, which is very profitable. In case further, the signal that the camera as well as the flash light device has been duly set for the flash light photography, namely the flash light photographic mode setting signal is not generated, the flash light device does not operate at the time of shutter operation, whereby at this time, the circuit for taking photograph under day light so as to automatically obtain an exposure under day light so that good pictures can always be obtained.

Further, by providing the shutter dial lock means as shown in FIG. 2 and FIG. 9 to FIG. 13, the safety device for the flash light photography is completed.

Further, in the explanation of the present invention, it is supposed that the camera and the flash light device are composed separately from each other, while it is possible to compose the camera with a built in flash light device almost similarly to the above mentioned embodiments whereby the effect to be obtained is almost the same as in the above mentioned case. Thus it goes without saying that the present invention is limited to the cameras in the embodiments and can be applied to any kind of cameras capable of taking photograph under flash light.

What is claimed is:

1. A photographic camera for use with a flash device, which can be selectively operated at a first operating mode to adapt it to ordinary photography without the use of said flash device, and a second operating mode to adapt it to a flash photography with the use of said flash device, wherein said camera comprises:
   A. a manually operable setting means for setting an exposure value at said camera, having a plurality of setting positions which permits the setting of a plurality of exposure values and containing at least one exposure value which can be commonly used both in ordinary photography and flash photography, and
   B. a mode selecting means to select automatically an operating mode of said camera, having:
   1. a first detecting means to detect the exposure value set by said setting means, and
   2. a second detecting means to detect the state of flash preparation of said flash device, wherein the operating mode of said camera is set at said second mode only when the exposure value is set at a value suitable for flash photographing and said flash device is in a flash-preparation completed state, and the operating mode of said camera is set at said first mode when at least one condition out of the condition of setting the exposure value to a value suitable to flash photographing and the condition of completion of flash preparation of the flash device is not satisfied.

2. A camera according to claim 1, in which said flash device is made to be freely mountable to and dismountable from said camera, and said camera further comprising a mounting portion for mounting said flash device therein, wherein said flash device can be mounted to and dismounted from said mounting portion, and said second detecting means is provided in said mounting portion to detect whether said flash device is mounted to said mounting portion, thereby selecting an operating mode of said camera in cooperation with said first detecting means.

3. A camera according to Claim 1, in which said flash device includes:
   a storing means to store electrical energy consumed to emit flash light, and
   an energy level detecting means to detect the level of the electrical energy stored at said storing means, providing an electrical signal when the stored electrical energy has a prescribed level or higher, wherein:
      said first detecting means can control the input of the electrical signal supplied from said energy level detecting means into said camera and provides the electrical signal into said camera only when the exposure value is set at a value suitable for flash photographing, and
      said second detecting means can respond to the electrical signal supplied by said first detecting means and sets the operating mode of said camera at said second mode in response to said electrical signal.

4. A camera according to claim 3 which further comprises a control circuit means to control the operation of said flash device, wherein said second detecting means is electrically connected to said control circuit means and can change over said circuit means between its operating state and non-operating state, and further sets the operating mode of said camera at said second mode by setting said circuit means in an operating state in response to the electrical signal supplied by said first detecting means.

5. A camera according to claim 3, which further comprises an indicating means to indicate the operating mode of said camera, being electrically connected to said second detecting means and having its operation controlled by said first and second detecting means.

6. A camera according to claim 1, which further comprises a trigger means to trigger said flash device, being operatively connected to said flash device for triggering of said flash device, wherein said first detecting means can control the connection of said trigger means to said flash device, and which connects said trigger means to said flash device only when the exposure value is set at a value suitable for flash photography.

7. A camera according to claim 1, which further comprises a trigger means to trigger said flash device, being operatively connected to said flash device for triggering said flash device, and a control means to control the connection of said trigger means to said flash device, wherein said control means can detect the exposure value set by said setting means and connects said trigger means to said flash device only when the exposure value is set at a value suitable for flash photography.

8. A camera according to claim 1, which further comprises:
   a first information input means to input information necessary for ordinary photography, and
   a second information input means to supply information necessary for flash photography, wherein said first and second detecting means are electrically connected to said first and second information input means, and the input of the information from said second information input means into said camera is allowed to set the operating mode of said camera at said second mode only when the exposure value is set at a value suitable for flash photography, and said flash device is at a state in which flash preparation is completed, so that said camera is operated in said second mode, and when at least one condition out of the condition of the setting of the exposure value at a value suitable for flash photography and the condition where completion of flash preparation of said flash device is not satisfied, the input of the information from said first information input means into said camera is permitted for having said camera operated in said first mode, thereby setting the operating mode of said camera in said first mode.

9. A camera according to claim 8, which further comprises:
   a locking means to lock said setting means at a position to set an exposure value suitable to flash photography, wherein said locking means is manually operable from outside of said camera, and
   a switch means to control the input of the information from said second information input means into said camera in reponse to said locking means, wherein said switch means is operatively associated with said locking means, and the exposure value is set at a value suitable for flash photography by said setting means in cooperating with said first and second detecting means then at the same time, only when said setting means is locked at a position to set an exposure value suitable for flash photography and said flash device is at a state wherein flash preparation is completed, the input of the information from said second information input means into said camera being permitted to set the operating mode of said camera in said second mode.

10. A photographic camera for use with a flash device, comprising:
   A. an exposure control device, which can be selectively operated at:
      a first operating mode to adapt it to ordinary photography without use of said flash device, and
      a second operating mode to adapt it to flash photography with the use of said flash device,
   B. a setting means for setting an exposure value at said exposure control device having a plurality of setting positions which allows the setting of such plurality of exposure values and containing at least one exposure value which can be commonly used both in ordinary photographing and flash photographing, and
   C. a mode selecting means to select the operating mode of said exposure control device, having:
      1. a first detecting means to detect the exposure value set by said setting means, and
      2. a second detecting means to detect the state of flash preparation of said flash device, wherein only when the exposure value is set at a value suitable for flash photography and said flash device has completed its preparation for flash, is the operating mode of said exposure control device set at said second mode, and when at least one condition for setting of the exposure value at a value suitable for flash photography and the condition where completion of flashing preparation of said flash device is not satisfied, the operating mode of said exposure control device is set in said first mode.

11. A camera according to claim 10, in which said flash device is so made as to be freely mountable to and dismountable from said camera, and said camera further comprises a mounting portion for mounting said flash device, wherein said flash device can be mounted to and dismounted from said mounting portion, and said second detecting means is provided in said mounting portion and selects the operating mode of said exposure control device in cooperating with said first detecting means by detecting whether or not said flash device is mounted to said mounting portion.

12. A camera according to claim 11, in which said exposure control device has:
 a first exposure control means which operates for exposure control based on the exposure value set by said setting means,
 a second exposure control means which operates in cooperation with said first exposure control means for exposure control,
 a first information input means to input information necessary for ordinary photographing into said second exposure control means, wherein said second exposure control means works for exposure control at a time of ordinary photography, based on the information provided by said first information input means, and
 a second information input means to have information necessary for flash photographing supplied into said second exposure control means, wherein said second exposure control means operates for exposure control at a time of flash photography based on the information provided by said second information input means, and said mode selecting means can control the change over of the input of the informations from said first and second information input means into said second exposure control means,
 and wherein only when an exposure value suitable to flash photography is set at said first exposure control means by said setting means and said flash device is mounted to said mounting portion, the input of the information from said second information input means into said second exposure control means is allowed, thereby setting the operating mode of said exposure control device at said second mode, and
 when at least one condition out of the condition of setting of the exposure value at a value suitable to flash photographing and the condition of mounting of said flash device to said mounting portion is not satisfied, the input of the information from said first information input means into said second exposure control means is permitted, thereby setting the operating mode of said exposure control device in said first mode.

13. A camera according to claim 12, in which said first information input means has a brightness information generating means to generate an electrical signal corresponding to the brightness of an object to be photographed, wherein said generating means can be selectively connected to said second exposure control means, and said second information input means has a distance information generating means to generate an electrical signal corresponding to the distance from said camera to said object, wherein said generating means can be selectively connected to said second exposure control means, further wherein, said mode selecting means can control the change over and connection of said brightness information generating means and said distance information generating means to said second exposure control means, wherein only when an exposure value suitable to flash photographing is set at said first exposure control means by said setting means and said flash device is mounted to said mounting portion, the operating mode of said exposure control device is set at said second mode by electrically connecting said distance information generating means to said exposure control means, and when at least one condition out of the condition of setting of the exposure value at a value suitable to flash photographing and the condition of mounting of said flash device to said mounting portion is not satisfied, the operating mode of said exposure control device is set at said first mode by electrically connecting said brightness information generating means to said second exposure control means, and wherein said second exposure control means operates for exposure control at a time of ordinary photography based on the electrical signal provided by said brightness information generating means and works for exposure control at a time of flash photographing based on the electrical signal provided by said distance information generating means.

14. A camera according to claim 13, which further comprises:
 a locking means to lock said setting means at a position to set an exposure value suitable to flash photography, wherein said locking means is manually operable from outside of said camera, and
 a switch means to control the connection of said distance information generating means to said second exposure control means in response to said locking means, wherein said switch means is operatively association with said locking means, further wherein only when the exposure value is set at a value suitable to flash photography by said setting means, and the setting means is locked at a position to set an exposure value suitable to flash photography by said locking means, further, said flash device is mounted to said mounting portion, the operating mode of said exposure control device is set at said second mode by electrically connecting said distance information generating means to said second exposure control means, in cooperation with said first and second detecting means.

15. A camera according to claim 10, in which said exposure control device has a control circuit means to control said flash device at a time of flash photography, wherein said mode selecting means can control the change over of said control circuit means between its operative state and its non-operative state, further wherein
 only when the exposure value is set at a value suitable to flash photography and said flash device has its preparation for flashing completed, said exposure control device is set at said second mode by setting said control circuit means at its operative state, and when at least one condition out of the condition of setting of exposure value at a value suitable to flash photography and the condition of completion of flashing preparation of said flash device is not satisfied, in the operating mode of said exposure control device set at said first mode by setting said control circuit means at its non-operative state.

16. A camera according to claim 15, in which said flash device has:
a storing means to store electrical energy consumed to emit flash light, and
an energy level detecting means to detect the level of the electrical energy stored at said storing means, wherein said detecting means outputs an electrical signal when the stored electrical energy reaches a predetermined level or higher, and
wherein said first detecting means can control the input into said camera of the electrical signal provided from said energy level detecting means, and supplies the electrical signal into said camera only when the exposure value is set at a value suitable to flash photographing, and
said second detecting means can respond to the electrical signal supplied by said first detecting means and responds to said electrical signal to set said control circuit means in its operating state.

17. A camera according to claim 16, in which said second detecting means includes a semiconductor switching means which can respond to said electrical signal provided by said first detecting means, wherein said switching means is electrically connected to said first detecting means and said control circuit means and responds to the electrical signal supplied by said first detecting means to change over said control circuit means from its non-operative state to its operative state.

18. A camera according to claim 17, in which said control circuit means includes a light setting circuit to set the amount of light emitted by said flash device, wherein said setting circuit is electrically connected to said switching means and its change over between its operative state and its non-operative state is controlled by said switching means.

19. A camera according to claim 18, which further comprises an indicating means to indicate the operation of non-operation of said light setting circuit, wherein said indicating means is electrically connected to said switching means and its operation is controlled by said switching means.

20. A camera according to claim 10, in which said flash device has:
a storing means to store electrical energy consumed to emit flash light, and
an energy level detecting means to detect the level of the electrical energy stored at said storing means, wherein said detecting means provides an electrical signal when the stored electrical energy reaches a predetermined level or higher, and
said exposure control device has:
a first exposure control means which operates for exposure control based on the exposure value set by said setting means,
a second exposure control means which operates in cooperation with said first exposure control means for exposure control,
a first information input means to input the information necessary for ordinary photography into said second exposure control means, wherein said second exposure control means works for exposure control at a time of ordinary photography based on the information provided by said first information input means, and
a second information input means to input the information necessary for flash photography into said second exposure control means, wherein,
said second exposure control means operates for exposure control at a time of flash photography based on the information provided by said second information input means,
said first detecting means can control the input into said camera of the electrical signal provided from said energy level detecting means, and supplies the electrical signal into said camera only when the exposure value is set at a value suitable to flash photographing, and
said second detecting means can control the change over of the input of the informations supplied from said first and second information input means into said second exposure control means based on the electrical signal supplied by said first detecting means, and permits the input into said second exposure control means of the information from said second information input means in response to said electrical signal supplied by said first detecting means, thereby setting said exposure control device at said second mode.

21. A camera according to claim 20, in which said first information input means has a brightness information generating means to generate an electrical signal corresponding to the brightness of an object to be photographed, wherein said generating means can be selectively connected to said second exposure control means,
while second information input means has a distance information generating means to generate an electrical signal corresponding to the distance from said camera to said object, wherein said generating means can be selectively connected to said second exposure control means, and wherein, said second control means operates for exposure control at a time of ordinary photographing based on the electrical signal provided by said brightness information generating means, and operates for exposure control at a time of flash photographing based on the electrical signal provided by said distance information generating means, and said second detecting means can control the change over of the connection to said second exposure control means of said brightness information generating means and said distance information generating means, and connects said distance information generating means to said second exposure control means in response to said electrical signal inputted by said first detecting means, thereby setting said exposure control device at said second mode.

22. A camera according to claim 21, in which said second detecting means has a semiconductor switching means to control the change over of the connection to said second exposure control means of said brightness information generating means, wherein said switching means is electrically connected to said first detecting means and said both information generating means and disconnects said brightness information generating means from said second exposure control means in response to said electrical signal supplied by said first detecting means and at the same time connects said distance information generating means.

23. A camera according to claim 21, which further comprises an indicating means to indicate the change over state of connection to said second exposure control means of said brightness information generating means and said distance information generating means, wherein said indicating means is electrically connected to said switching means and has its operation controlled by said switching means.

24. A camera according to claim 10, which further comprises:
  a trigger means to trigger said flash device, being operatively connected to said flash device for triggering said flash device, and
  a control means to control the connection of said trigger means to said flash device, wherein said control means can detect the exposure value set by said setting means, and connects said trigger means to said flash device only when the exposure value is set at a value suitable for flash photography.

25. A photographic camera for use with a flash device comprising:
  A. a first exposure control means for controlling exposure time of said camera;
  B. a setting means for setting an exposure time value at said first exposure control means, wherein said setting means has a plurality of setting positions which allows to set a plurality of exposure time values containing at least one exposure time value which can be commonly used in both ordinary photography and flash photography, and is manually operable,
  C. a second exposure control means for controlling exposure aperture of said camera, being selectively operable between a first operating mode to adapt the camera to ordinary photography without the use of said flash device, and a second operating mode to adapt the camera to flash photography with the use of said flash device, and
  D. a mode selecting means to select the operating mode of said second exposure control means, having:
    1. a first detecting means to detect the setting position of said setting means, and
    2. a second detecting means to detect the state of flashing preparation of said flash device, wherein said mode selecting means sets the operating mode of said second exposure control means at said second mode only when said setting means is at a predetermined setting position to set said first exposure control means at an exposure time value suitable to flash photographing, and said flash device is at a state in which preparation for flashing is completed, and when said setting device is at other setting positions than said predetermined setting position and/or said flash device has not completed its flashing preparation, it sets the operating mode of said second exposure control means at said first mode.

26. A camera according to claim 25, in which said second exposure control means has:
  an adjusting means for adjusting exposure aperture of said camera;
  a first information input means to provide an information corresponding to the brightness of an object to be photographed for said adjusting means, wherein said input means can be selectively connected to said adjusting means, and said adjusting means works for exposure aperture adjusting at a time or ordinary photographing based on the above mentioned information provided by said first information input means; and
  a second information input means to provide an information corresponding to the distance to said object from the camera for said adjusting means, wherein said input means can be selectively connected to said adjusting means, and
  wherein said adjusting means operates for exposure aperture adjusting at a time of flash photographing based on the information provided by said second information input means, and said mode selecting means can control the change over of the connection to said adjusting means of said first and second information input means, and
  wherein only when said setting means is at a predetermined setting position to set said first exposure control means at an exposure time value suitable to flash photographing, and said flash device is at a state wherein preparation for flashing is completed, said second information input means is connected to said adjusting means, thereby setting the operating mode of said second exposure control means at said second mode, and when said setting means is at other setting positions than said predetermined setting position and/or when said flash device has not completed its preparation for flashing, said first information input means is connected to said adjusting means, thereby setting the operating mode of said second exposure control means at said first mode.

27. A camera according to claim 26, in which said flash device is made to be freely mountable on and dismountable from said camera, and said camera further comprises a mounting portion for mounting said flash device, wherein: said flash device can be mounted on and dismounted from said mounting portion, and said second detecting means is provided within said mounting portion and detects whether said flash device is mounted on said mounting portion, thereby controlling the change over of the connection to said adjusting means of said first and second information input means in cooperation with said first detecting means.

28. A camera according to claim 27 which further comprises:
  a locking means which is to lock said setting means at said predetermined setting position but is releasable, further is manually operable from outside of a camera, and
  a switch means to control the connection of said second information input means to said adjusting means in response to said locking means, wherein said switch means is operatively connected to said locking means and connects said second information input means to said adjusting means in cooperation with said first and second detecting means only when said setting means is changed over to said predetermined position and said setting means is locked by said locking means at said predetermined position, and wherein said flash device is mounted on said mounting portion, whereby setting the operating mode of said second exposure control means at said second mode.

29. A camera according to claim 26, in which said flash device has:
  a storing means to store the electrical energy consumed to emit flash light, and
  an energy level detecting means to detect the level of the electrical energy stored at said storing means, wherein said detecting means outputs an electrical signal when the stored electrical energy reaches a predetermined level or higher, and further wherein said first detecting means can control the input of the electrical signal provided from said energy level detecting means into said camera, and supplies the electrical signal into the camera only when said setting means is changed over to said predetermined setting position, and said second detecting means can respond to said electrical signal supplied by said first detecting means and connects said second information input means to said adjusting means in reponse to said electrical signal, thereby setting the operating mode of said second exposure control means at said second mode.

30. A camera according to claim 29, which further comprises an indicating means to indicate the operating mode of said second exposure control means, wherein said indicating means is electrically connected to said second detecting means and has its operation controlled by said second detecting means.

31. A camera according to claim 26, which further comprises:
a trigger means to trigger said flash device in synchronism with the operation of said first exposure control means, wherein said trigger means is operatively associated with said first exposure control means and is electrically connected to said flash device for triggering said flash device, and
control means to control the change over between the connection and disconnection of said trigger means to and from said flash device corresponding to the setting position of said setting means, wherein said control means can detect the setting position of said setting position, and electrically connects said trigger means to said flash device only when said setting means is changed over to said predetermined position.

32. A photographic camera for use with a flash device which is made to be freely mountable on and dismountable from said camera, wherein said camera comprises:
A. a mounting portion for mounting said flash device, wherein said flash device is mountable on and dismountable from said mounting portion,
B. a first exposure control means for controlling exposure time of said camera,
C. a setting means for setting an exposure time value at said first exposure control means, wheren said setting means is manually operable and has a plurality of setting positions which allows the setting of a plurality of exposure time values containing at least one exposure time value which can be commonly used both in ordinary photographing and flash photographing,
D. a second exposure control means for controlling exposure aperture of said camera, being selectively operable at a first operating mode to adapt said camera to ordinary photographing without the use of said flash device, and a second operating mode to adapt said camera to flash photographing with the use of said flash device, and
E. a mode selecting means to select the operating mode of said second exposure control means, comprising:
1. a first detecting means to detect the setting position of said setting means, and
2. a second detecting means to detect whether or not said flash device is mounted to said mounting portion, being provided in said mounting portion, wherein said mode selecting means sets the operating mode of said second exposure control means at said second mode only when said setting means is at a predetermined setting position to set an exposure time value suitable to flash photographing for said first exposure control means and said flash device is mounted to said mounting portion, and sets the operating mode of said second exposure control means at said first mode when said setting means is at other setting positions than said predetermined setting position and/or said flash device is not mounted on said mounting portion.

33. A camera according to claim 32, which further comprises:
a trigger means to trigger said flash device in synchronism with the operation of said first exposure control means, wherein said trigger means is operatively associated with said first exposure control means and is electrically connected to said flash device for triggering said flash device, and
a control means to control the change over between the connection and disconnection of said trigger means to and from said flash device corresponding to the setting position of said setting means, wherein said control means can detect the setting position of said setting position, and electrically connects said trigger means to said flash device only when said setting means is changed over to said predetermined position.

34. A photographic camera for use with a flash device which has a storing means to store the electrical energy consumed to emit flash light, and an energy level detecting means to detect the level of the electrical energy stored at said storing means, wherein said detecting means provides an electrical signal when the stored electrical energy reaches a predetermined level or higher, wherein said camera comprises
A. an exposure control means for controlling exposure time of said camera,
B. a setting means for setting an exposure time value at said exposure control means, wherein said setting means is manually operable and has a plurality of setting positions to allow the setting of a plurality of exposure time values containing at least one exposure time value which can be used in common in ordinary photographing and flash photographing,
C. an electrical circuit means to set the amount of luminescence of said flash device, being electrically connected to said flash device, and
D. a change-over means to change over and control said electrical circuit means between its operative state and its non-operative state, having:
1. a first switching means to change over said circuit means from its non-operative state to its operative state in response to the electrical signal outputted from said energy level detecting means of the flash device, wherein said switching means is electrically connected to said circuit means, and
2. a second switching means to control the input of said electrical signal into said first switching means in response to the setting position of said setting means, wherein said switching is electrically connected to said first switching means and is operatively associated with said setting means to allow the input of the electrical signal into said first switching means only when said setting means is changed over to a predetermined setting position to set an exposure value suitable to flash photographing at said exposure control means, whereby said change-over means sets said electrical circuit means at its operative state only when said setting means is changed over to said predetermined setting position and the electrical energy stored at said storing means reaches said predetermined level or higher, and sets said electrical circuit means in a non-operative state when said setting means is changed over to setting positions other than said predetermined position and or when the electrical energy stored at said storing means does not reach said predetermined level.

35. A camera according to claim 34, which further comprises:

a trigger means to trigger said flash device in synchronism with the operation of said exposure control means, wherein said trigger means is operatively associated with said exposure control means and is electrically connected to said flash device for triggering said flash device, and a control means to control the change over between the connection and disconnection of said trigger means to and from said flash device in correspondence with the setting position of said setting means, wherein said control means can detect the setting position of said setting means and electrically connects said trigger means to said flash device only when said setting means is changed over to said predetermined position.

36. A photographic camera for use with a flash device which has:

a storing means to store the electrical energy consumed to emit flash light, and an energy level detecting means to detect the level of the electrical energy stored at said storing means, wherein said detecting means provides an electrical signal when the stored electrical energy reaches a predetermined level or higher, wherein said camer comprises:

A. a first exposure control means for controlling exposure time of said camera,

B. a setting means for setting an exposure time value at said first exposure control means, wherein said setting means is manually operable and has a plurality of setting positions to allow the setting of a plurality of exposure time values containing at least one exposure time value which can be used commonly in ordinary photographing and flash photographing, C. a second exposure control means for controlling exposure aperture of said camera, being selectively operable at: a second operating mode to adapt the camera to flash photographing with use of said flash device, D. a trigger means to trigger said flash device in synchronism with the operation of said first exposure control means, wherein said trigger means is operatively associated with said first exposure control means and is electrically connected to said flash device for triggering said flash device, E. a control means to control the change over between the connection and disconnection of said trigger means to and from said flash device in response to the setting position of said setting means, wherein said control means is operatively associated with said setting means and electrically connects said trigger means to said flash device only when said setting means is changed over to a predetermined setting position to set such exposure value as being suitable to flash photographing for said first exposure control means, and F. a mode selecting means to select the coperating mode of said second exposure control means, comprising:

1. a first switching means to set the operating mode of said second exposure control means at said said second mode in response to the electrical signal provided from said energy level detecting means of the flash device, wherein said switching means is electrically connected to said second exposure control means, and 2. a second switching means to control the input of said electrical signal into said first switching means in response to the setting position of said setting means, wherein said switching means is electrically connected to said first switching means and is operatively associated with said setting means, and allows the input of the electrical signal into said first switching means only when said setting means is changed over to said predetermined setting position, whereby said mode selecting means sets the operating mode of said second exposure control means at said second mode only when said setting means is changed over to said predetermined setting position and the electrical energy stored at said storing means reaches said predetermined level or higher, and said mode selecting means sets the operating state of said second exposure control means at said first mode when said setting means is changed over to other setting positions than said predetermined position and/or the electrical energy stored at said storing means does not reach said predetermined level.

* * * * *